(12) United States Patent
Yajima

(10) Patent No.: US 12,523,842 B2
(45) Date of Patent: Jan. 13, 2026

(54) LENS BARREL

(71) Applicant: Nittoh Inc., Nagano (JP)

(72) Inventor: Atsuro Yajima, Nagano (JP)

(73) Assignee: NITTOH INC., Nagano (JP)

( * ) Notice: Subject to any disclaimer, the term of this patent is extended or adjusted under 35 U.S.C. 154(b) by 313 days.

(21) Appl. No.: 18/550,465

(22) PCT Filed: Feb. 1, 2022

(86) PCT No.: PCT/JP2022/003798
§ 371 (c)(1),
(2) Date: Sep. 14, 2023

(87) PCT Pub. No.: WO2022/201877
PCT Pub. Date: Sep. 29, 2022

(65) Prior Publication Data
US 2024/0053577 A1    Feb. 15, 2024

(30) Foreign Application Priority Data

Mar. 23, 2021 (JP) ................................. 2021-048784

(51) Int. Cl.
G02B 7/10 (2021.01)
(52) U.S. Cl.
CPC ....................... *G02B 7/10* (2013.01)
(58) Field of Classification Search
CPC .......... G02B 7/10; G02B 7/023; G02B 7/102; G03B 17/14; G03B 3/02; G03B 5/00; H04N 23/55
See application file for complete search history.

(56) References Cited

U.S. PATENT DOCUMENTS

| 8,743,472 | B2 | 6/2014 | Ouchi |
| 8,879,176 | B2 | 11/2014 | Ouchi |
| 2019/0154950 | A1* | 5/2019 | Hanaoka ............... G03B 21/142 |

FOREIGN PATENT DOCUMENTS

| JP | H09096750 A | 4/1997 |
| JP | H11337799 A | 12/1999 |
| JP | 2000075182 A | 3/2000 |
| JP | 2009-086567 A | 4/2009 |
| JP | 2011-158526 A | 8/2011 |
| WO | 2012128202 A1 | 9/2012 |
| WO | 2012128203 A1 | 9/2012 |

OTHER PUBLICATIONS

Extended European Search Report in EP Application No. 22774679.9, mailed Jan. 30, 2025, 6pp.

* cited by examiner

*Primary Examiner* — James C. Jones
(74) *Attorney, Agent, or Firm* — HAUPTMAN HAM, LLP

(57) ABSTRACT

A lens barrel is provided with an adjustment mechanism and the adjustment mechanism has a fixed side hole part, a cam-side hole par, a driving transmission part that is provided on the outer peripheral side of a movable lens holding frame in the same straight line as the fixed side hole part and the cam-side hole part in a state where these hole parts are aligned, an inner peripheral engagement part that is formed on an inner peripheral surface of a fixed lens holding frame, and an outer peripheral engagement part that is formed on an outer peripheral surface of the movable lens holding frame in a state of engaging with the inner peripheral engagement part, and moves the movable lens holding frame in an optical axis direction by rotating with respect to the inner peripheral engagement part.

17 Claims, 8 Drawing Sheets

X1 ←——→ X2

LENS BARREL

CROSS REFERENCE TO RELATED APPLICATIONS

This is a U.S. national stage of application No. PCT/JP2022/003798, filed on Feb. 1, 2022. Priority under 35 U.S.C. § 119(a) and 35 U.S.C. § 365(b) is claimed from Japanese Patent Applications No. 2021-048784 filed on Mar. 23, 2021.

TECHNICAL FIELD

The present invention relates to a lens barrel.

BACKGROUND ART

Among lens barrels provided to cameras, there is one that uses an eccentricity adjusting device at a fixed focus and adjusts a resolution by rotating a lens around an optical axis, as described in Patent Literature 1, for example. This Patent Literature 1 discloses a technique of performing an eccentricity adjustment of a first lens (26A) that constitutes a rear fixed focus lens (26) by rotating a rotary member (54) including a gear (54A).

CITATION LIST

Patent Literature

{PTL 1} JP 2000-75182 A

SUMMARY OF INVENTION

Technical Problem

Incidentally, the configuration disclosed in Patent Literature 1 is one in which the lens is rotated at the fixed focus, and the eccentricity adjustment can be performed. However, an adjustment of lens interval like a zoom mechanism cannot be performed.

Further, under the present circumstances, in order to correct various aberrations (spherical aberration, curvature of field, and the like) caused by a manufacturing error of a lens barrel, in a lens group that moves as the zoom mechanism, an adjustment member such as a shim or a washer is arranged at a predetermined portion of a lens frame that holds a lens (a portion between lens frames that hold respective lenses, or the like). Further, a thickness or the number of adjustment members is changed according to need, to thereby perform an adjustment to make a lens interval have a desired dimension.

However, in such an adjustment, the interval of the lens adjustment is limited by a lineup of the shim or the washer, and thus it is difficult to perform a fine adjustment of the lens interval. Further, when performing the adjustment of the lens interval, there is a need to exchange an already-incorporated shim or washer, so that a lens barrel is required to be disassembled for the exchange. Accordingly, a man-hour is increased, and besides, when disassembling the lens barrel, there is a possibility such that dust enters inside the lens barrel or a lens is damaged. Specifically, there is a risk of performance deterioration in the disassembly of the lens barrel. Further, in order to evaluate the performance of the lens barrel after the adjustment of the lens interval, there is a need to reassemble the lens barrel. However, if it is not possible to obtain desired performance as a result of the performance evaluation, there is a need to disassemble the lens barrel again to perform a fine adjustment. Specifically, the disassembly and the assembly of the lens barrel are required to be performed every time the adjustment of the lens interval and the evaluation are repeated, which creates a state where a considerable amount of man-hour is required.

The present invention has been made in consideration of such problems, and an object thereof is to provide a lens barrel in which a lens interval of a movable zoom lens group can be finely adjusted from the outside.

Solution to Problem

In order to solve the above-described problems, according to a first aspect of the present invention, there is provided a lens barrel being a lens barrel holding a lens system therein, the lens system having a plurality of lens groups each having one or more optical elements, the lens barrel including: a fixed tube on which a guide groove that is along an optical axis direction and where a cam follower enters is formed; a cam tube rotatably provided with respect to the fixed tube, and having a cam groove where the cam follower enters and that is oblique with respect to the optical axis direction; a moving mechanism unit that changes a focal distance or a focal position by moving at least one lens group out of the lens groups, as a moving lens group, in the optical axis direction; and an adjustment mechanism for adjusting a position in the optical axis direction of at least one of the optical elements constituting an adjustment moving lens group being at least one of the moving lens groups, in which the moving mechanism unit includes: a moving holding frame to which the cam follower is attached, and that moves in the optical axis direction in accordance with a relative rotation of the cam tube with respect to the fixed tube; and a movable lens holding frame that holds at least a part of the optical elements of the moving lens group, and the adjustment mechanism includes: a fixed side hole part that penetrates the fixed tube; a cam-side hole part that penetrates the cam tube, and that is aligned with the fixed side hole part when the cam tube is rotated with respect to the fixed tube; a driving transmission part that is provided on an outer peripheral side of the movable lens holding frame in the same straight line as the fixed side hole part and the cam-side hole part in a state where these hole parts are aligned; an inner peripheral engagement part that is formed on an inner peripheral surface of the moving holding frame; and an outer peripheral engagement part that is formed on an outer peripheral surface of the movable lens holding frame in a state of engaging with the inner peripheral engagement part, and moves the movable lens holding frame in the optical axis direction by rotating with respect to the inner peripheral engagement part when an external force is transmitted in a rotational direction via the driving transmission part.

Further, according to another aspect of the present invention, it is preferable that, in addition to the above-described invention, the adjustment moving lens group has at least a first adjustment moving lens small group and a second adjustment moving lens small group, in which the first adjustment moving lens small group is held by the moving holding frame, and the second adjustment moving lens small group is held by the movable lens holding frame.

Further, according to another aspect of the present invention, it is preferable that, in addition to the above-described invention, a position fixing mechanism that fixes positions of the fixed lens holding frame and the movable lens holding frame after the interval adjustment of the frames by the adjustment mechanism is finished, is provided, in which the position fixing mechanism includes: a screw hole that penetrates a cylindrical part provided to the moving holding frame; a fixing screw that is screwed in the screw hole; a fixed side through hole that penetrates the fixed tube, allows the fixing screw to be inserted therein, and exists in the same straight line as the screw hole; and a cam-side through hole that penetrates the cam tube, allows the fixing screw to be inserted therein, and exists in the same straight line as the screw hole and the fixed side through hole when the cam-side hole part is aligned with the fixed side hole part.

Further, according to another aspect of the present invention, it is preferable that, in addition to the above-described invention, the fixed side through hole is provided at a position at which it does not interfere with the fixed side hole part, and the cam-side through hole is provided at a position at which it does not interfere with the cam-side hole part.

Further, according to another aspect of the present invention, it is preferable that, in addition to the above-described invention, the moving holding frame is provided with a positioning engagement part for performing positioning of an adjusting jig that is inserted from the outside.

Further, according to another aspect of the present invention, it is preferable that, in addition to the above-described invention, at a gap between the moving holding frame and the movable lens holding frame, an elastic member that biases both members in a direction in which the members are separated from each other is arranged.

Further, according to another aspect of the present invention, it is preferable that, in addition to the above-described invention, a plurality of the fixed side hole parts and the cam-side hole parts are provided at positions separated in the optical axis direction.

Further, another aspect of the present invention is preferably an imaging device including: the lens barrel according to the above-described invention; and an imaging element arranged on a telephoto side of the lens barrel.

Further, another aspect of the present invention is preferably an image display device including: the lens barrel according to the above-described invention; and an image display element arranged on a telephoto side of the lens barrel.

Advantageous Effects of Invention

According to the present invention, it is possible to provide a lens barrel in which a lens interval of a movable zoom lens group can be finely adjusted from the outside.

BRIEF DESCRIPTION OF DRAWINGS

FIGS. 4A and 4B are a view illustrating a positional relationship between a guide groove and a cam groove provided to the zoom mechanism unit of the lens barrel illustrated in FIG. 1, in which FIG. 4A is a view in which the zoom mechanism unit is developed in a plane, and FIG. 4B is a sectional view of the zoom mechanism unit.

DESCRIPTION OF EMBODIMENTS

Hereinafter, a lens barrel according to one embodiment of the present invention will be described based on the drawings. Note that in the following description, in an extending direction of an optical axis A1 (optical axis direction; X direction) of a lens barrel 10, an object side is defined as a front side (X1 side) and a side attached to a camera main body (telephoto side) is defined as a rear side (X2 side). Further, a direction orthogonal to the optical axis direction (X direction) is defined as a radial direction, a side separated from the optical axis A1 is defined as an outer diameter side, and a direction approaching the optical axis A1 is defined as an inner diameter side. Further, a rotational direction around the optical axis A1 is defined as a circumferential direction.

[Regarding Configuration]

Figure 1:
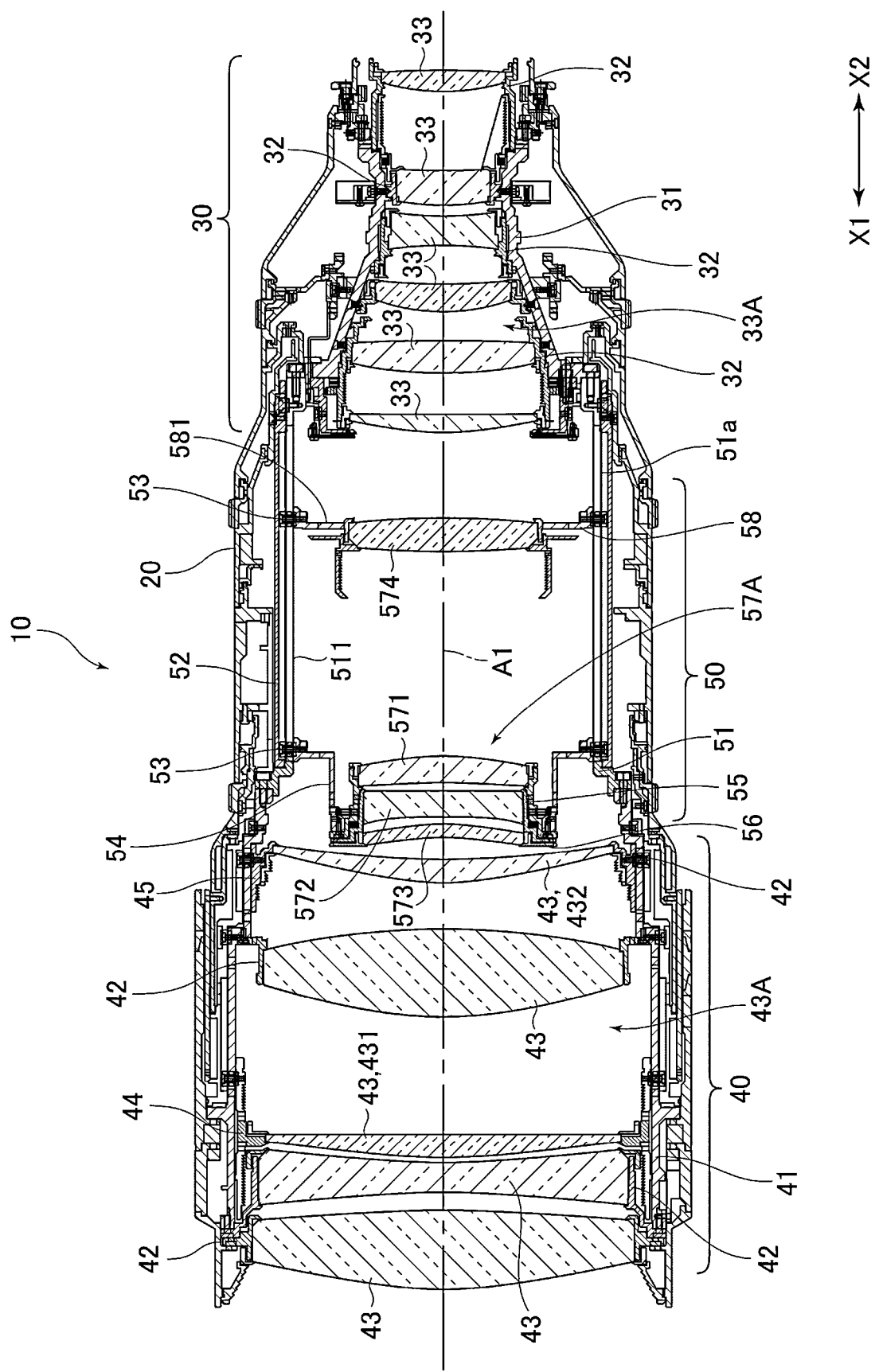
FIG. 1 is a sectional view in which a lens barrel according to one embodiment of the present invention is cut along an optical axis, and is a view illustrating a state where a third lens group (zoom lens group) is positioned on a wide-angle side (wide side).
Figure 2:
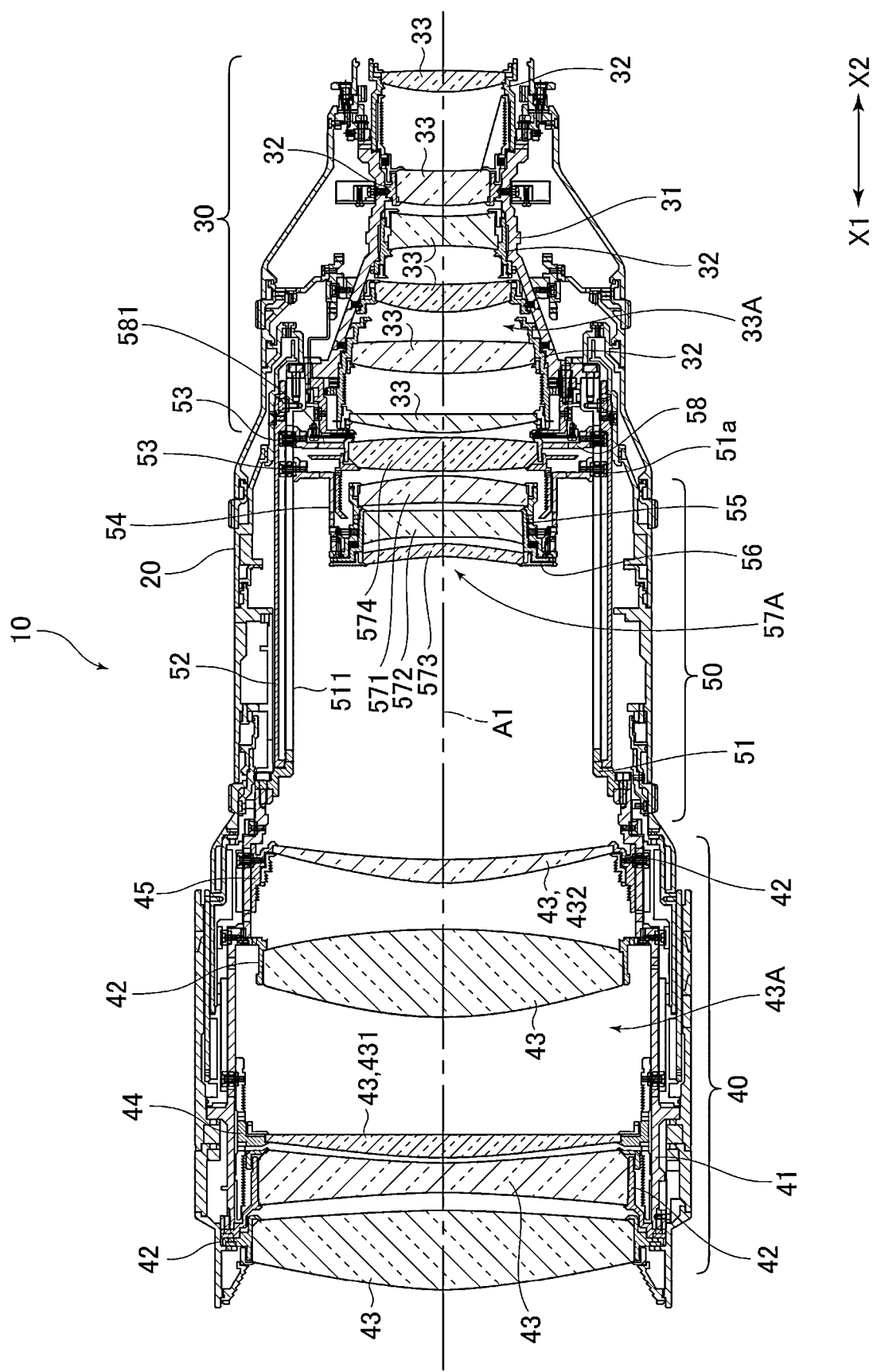
FIG. 2 is a view illustrating a state where the third lens group (zoom lens group) illustrated in FIG. 1 is positioned on a telephoto side (tele side).

FIG. 1 is a sectional view in which the lens barrel 10 according to one embodiment of the present invention is cut along the optical axis A1, and is a view illustrating a state where a third lens group 57A (an adjustment moving lens group) is positioned on a wide-angle side (wide side). Further, FIG. 2 is a view illustrating a state where the third lens group 57A (the adjustment moving lens group) illustrated in FIG. 1 is positioned on a telephoto side (tele side). Note that in FIG. 1 and FIG. 2, the configuration of the lens barrel 10 is appropriately illustrated in an omitted manner according to need, and omission is performed such that a plurality of lenses including a convex lens and a concave lens are appropriately illustrated in an integrated state (the same applies to the other drawings).

Although the lens barrel 10 of the present embodiment has a plurality of cylindrical parts and a lens system constituted of a plurality of lenses (optical elements), when classified broadly, they are constituted of an outer tube 20, a fixed lens unit 30, a focus mechanism unit 40, and a zoom mechanism unit 50. Further, the lens system has a plurality of lens groups each having one or more lenses, and a part of the lens groups is constituted as a moving lens group that moves along the optical axis direction (X direction) when performing zooming and focusing.

The outer tube 20 is a normal member that covers an outer peripheral side of the respective members of the lens barrel 10. This outer tube 20 may be constituted by combining a plurality of cylindrical members, or it may also be constituted of a single cylindrical member.

An end portion of the fixed lens unit 30 is attached to a camera main body (illustration is omitted) of a camera device being one example of an imaging device having an imaging element, for example. Specifically, the fixed lens unit 30 is positioned on the rear side (X2 side) in the optical axis direction (X direction) relative to the zoom mechanism unit 50. This fixed lens unit 30 includes a fixed tube 31, and lens holding frames 32 are arranged inside the fixed tube 31. Accordingly, on an inner tube side of the fixed lens unit 30, a first lens group 33A being one of lens groups and constituted of a plurality of lenses 33 is arranged via the lens holding frames 32. The respective lenses 33 of the first lens group 33A described above are fixed so that they do not move with respect to the fixed tube 31 and the lens holding frames 32. Note that the lens holding frame 32 may be provided for each lens 33, or it may also be one that holds some lenses 33. The first lens group 33A is a lens group that does not move along the optical axis direction (X direction) when performing focusing and zooming.

Further, the focus mechanism unit 40 is positioned on the front side (X1 side) in the optical axis direction (X direction) relative to the zoom mechanism unit 50. This focus mechanism unit 40 includes a fixed tube 41 similar to the above-described fixed tube 31, and lens holding frames 42 are arranged inside the fixed tube 41. Accordingly, on an inner tube side of the focus mechanism 40, a second lens group 43A being one of lens groups and constituted of a plurality of lenses 43 is arranged via the lens holding frames 42.

Here, some of the lens holding frames 42 in the focus mechanism unit 40 are attached to a moving frame 44 and a moving frame 45 capable of moving in the optical axis direction (X direction). Accordingly, some lenses 43 (referred to as lenses 431, 432) of the second lens group 43A can move in the optical axis direction (X direction) in accordance with the movement of the aforementioned moving frames 44, 45 in the optical axis direction (X direction), and such movement of the lenses 431, 432 enables a focus adjustment. In this case, each of the lenses 431, 432 is one of moving lens groups. For this reason, the second lens group 43A is constituted of four lens groups having two moving lens groups made of the lens 431 or the lens 432, and two lens groups arranged on the X1 side relative to the lens 431 and arranged between the lens 431 and the lens 432, respectively, and that do not move when performing focusing.

Note that when considering a sealing property inside the lens barrel 10, the moving frame 44 and the moving frame 45 preferably move the lens 431 on the rear side (X2 side) of the lens 43 that is positioned on the front side (X1 side) in the optical axis direction (X direction). Further, the lens holding frame 42 may be provided for each lens 43, or it may also be one that holds some lenses 43.

Figure 3:
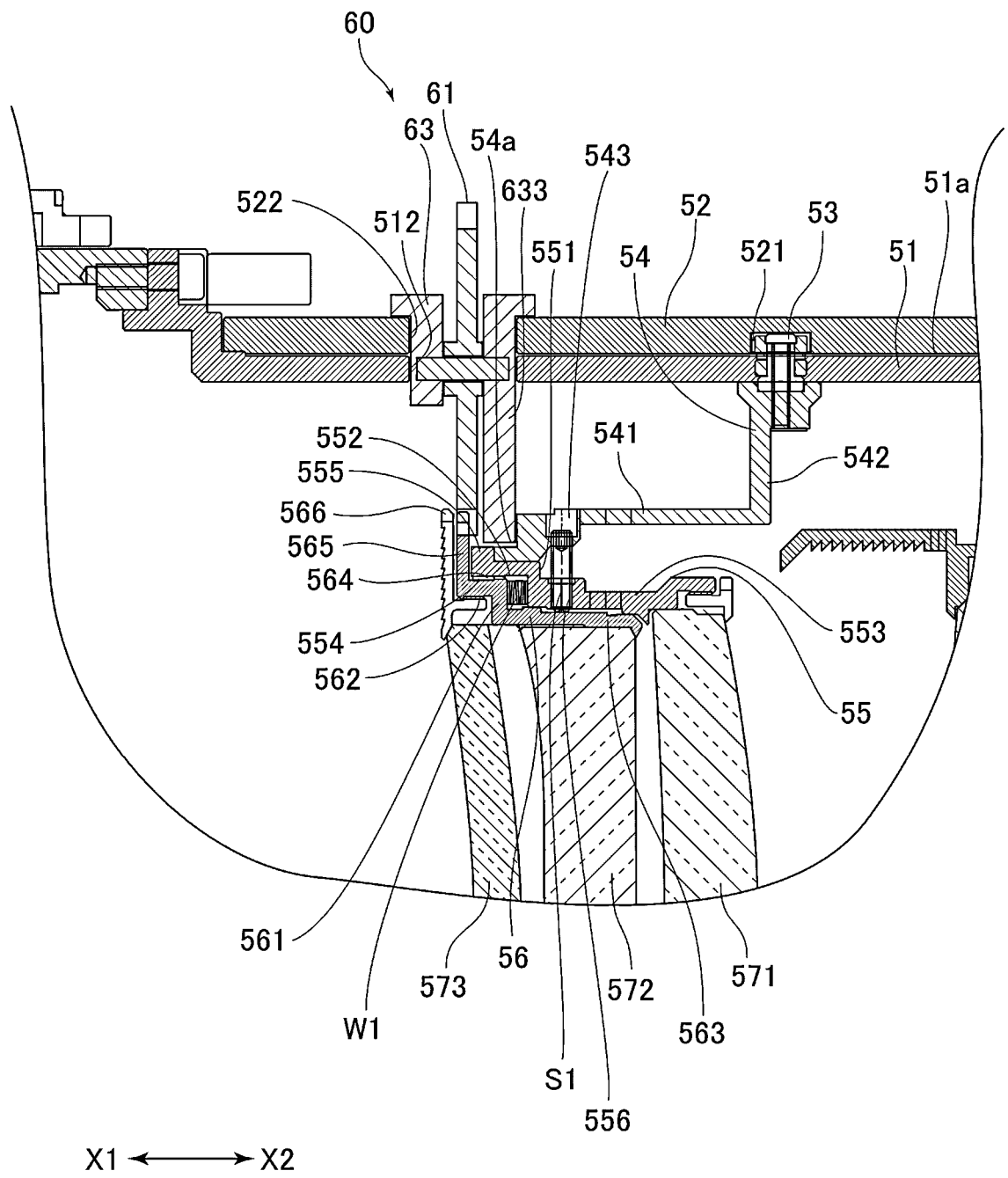
FIG. 3 is a partial sectional view illustrating, in an enlarged manner, a part of a zoom mechanism unit of the lens barrel illustrated in FIG. 1.

Next, the zoom mechanism unit 50 will be described. FIG. 3 is a partial sectional view illustrating, in an enlarged manner, a part of the zoom mechanism unit 50. As illustrated in FIG. 1 to FIG. 3, the zoom mechanism unit 50 has a fixed tube 51, a cam tube 52, a cam follower 53, a moving frame 54, a fixed lens holding frame 55, a movable lens holding frame 56, and a third lens group 57A that is one of moving lens groups, constituted of lenses 571, 572, 573, and that moves when performing zooming. Further, the zoom mechanism unit 50 also has a moving frame 58 and a lens 574. Note that the lens 571 corresponds to a first adjustment moving lens small group, and the lenses 572, 573 correspond to a second adjustment moving lens small group.

Among the above, the fixed tube 51 is a cylindrical member, and a large part thereof is arranged on an inner tube side of the cam tube 52. This fixed tube 51 is integrally fixed to the above-described fixed tubes 31, 41, via screws or the like. Accordingly, the fixed tube 51 is provided in a manner that it does not move or rotate in the optical axis direction (X direction), similarly to the above-described fixed tube 31 and fixed tube 41. To the fixed tube 51, a long groove-shaped guide groove 511 along the optical axis direction (X direction) is provided so as to penetrate an inner tube side (inside) and the outside of the fixed tube 51. At this guide groove 511, the cam follower 53 to be described later is positioned in a slidable state. Note that the cam follower 53 moves integrally with the moving frames 54, 58 to be described later, and a tip thereof on the outer diameter side of the lens barrel 10 is positioned at a later-described cam groove 521.

Figure 4A:
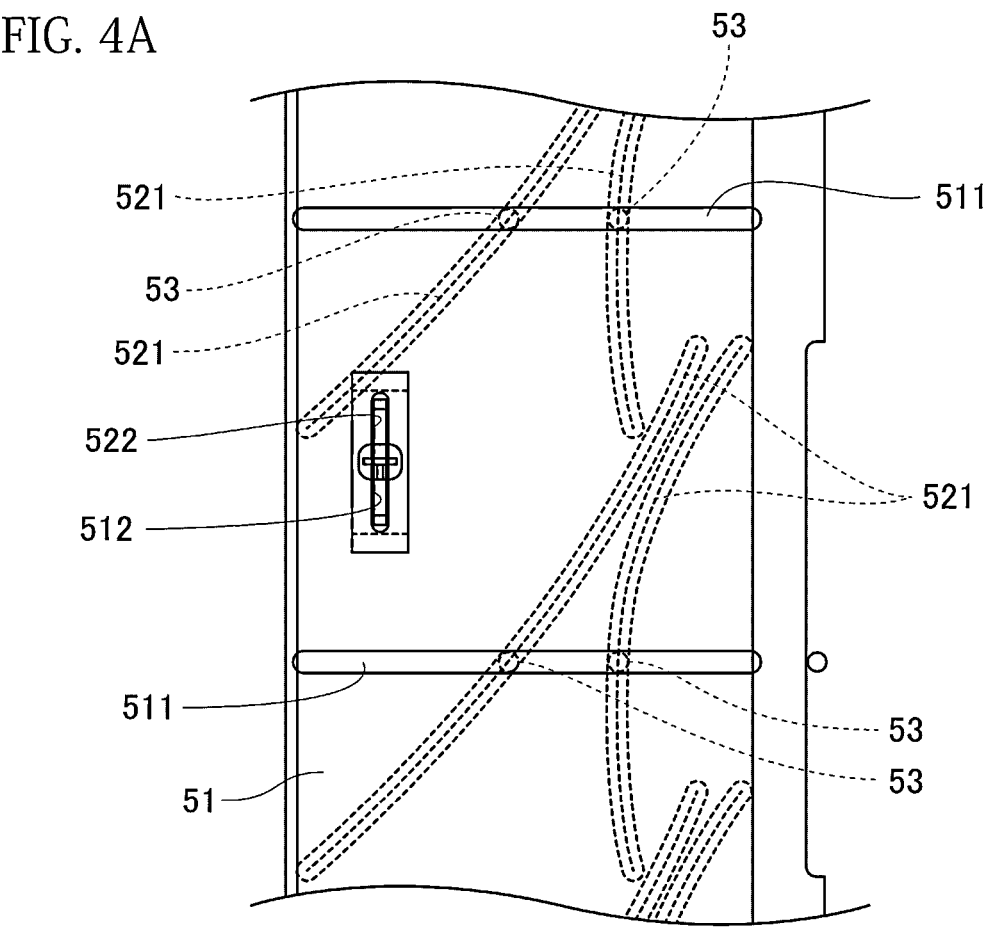
Figure 4B:
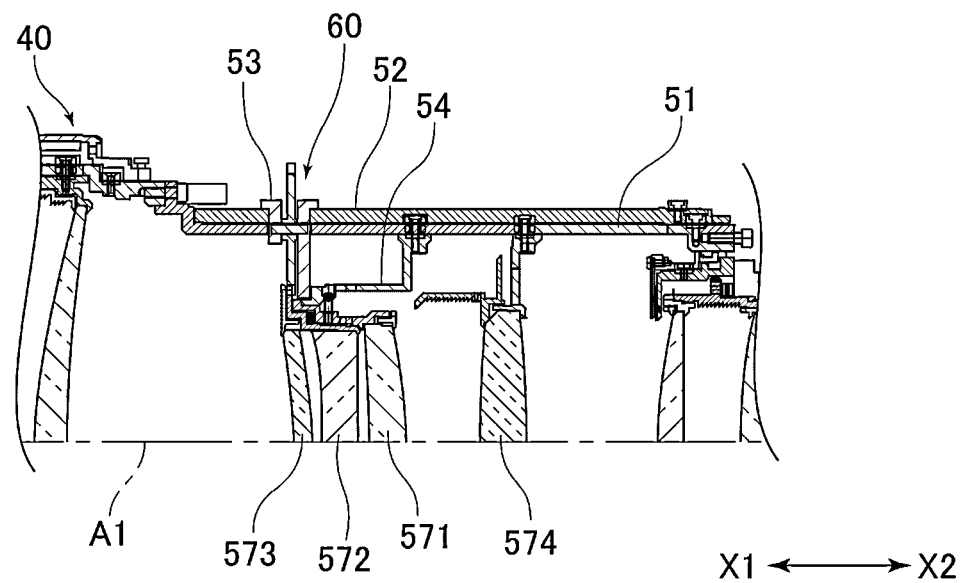

Further, the cam tube 52 is a cylindrical member that is arranged in a state of facing an outer peripheral surface 51a of the fixed tube 51, and rotatably attached with respect to the fixed tube 51. FIGS. 4A and 4B are a view illustrating a positional relationship between the guide groove 511 and the cam groove 521, in which FIG. 4A is a view in which the zoom mechanism unit 50 is developed in a plane, and FIG. 4B is a sectional view of the zoom mechanism unit 50. As illustrated in FIG. 3 and FIGS. 4A and 4B, on the inner tube side of the cam tube 52, the cam groove 521 with a predetermined length is provided. The cam groove 521 is formed to have a recessed cross section and formed to be oblique with respect to the optical axis direction (X direction). Further, the tip of the cam follower 53 on the outer diameter side enters the cam groove 521.

As described above, the cam follower 53 also enters the guide groove 511. Here, as illustrated in FIG. 4A, in a plan view in which the guide groove 511 is seen from the outside in the radial direction, the position of the cam follower 53 is regulated to a position where the guide groove 511 and the cam groove 521 are overlapped (overlapped position). Since the cam groove 521 is formed to be oblique with respect to the optical axis direction (X direction) as described above, when the cam tube 52 is rotated, the cam follower 53 positioned at the aforementioned overlapped position moves in the optical axis direction (X direction). By this movement, the moving frames 54, 58, the fixed lens holding frame 55, the movable lens holding frame 56, and the third lens group 57A also move in the optical axis direction (X direction) via the cam follower 53.

Further, the cam follower 53 attached on the outer diameter side of a flange part 542 of the moving frame 54, enters both the guide groove 511 and the cam groove 521 at the above-described overlapped position. In a similar manner, the cam follower 53 attached on the outer diameter side of a flange part 581 of the moving frame 58, enters both the guide groove 511 and the cam groove 521 at the above-described overlapped position.

Further, the moving frame 54 corresponds to a part of the moving holding frame. This moving frame 54 is a member that moves inside the fixed tube 51 in accordance with the movement of the cam follower 53 described above when the cam tube 52 is rotated by an external force. Here, the moving frame 54 is a frame member positioned on the front side (X1 side) in the optical axis direction (X direction) relative to the moving frame 58, and used for moving the lenses 571, 572, 573 in the optical axis direction (X direction). On the other hand, the moving frame 58 is a frame member positioned on the rear side (X2 side) in the optical axis direction (X direction) relative to the moving frame 58, and used for moving the lens 574 in the optical axis direction (X direction).

Note that as illustrated in FIG. 1 to FIG. 3, the moving frame 54 is provided with a cylindrical part 541 and the flange part 542. On the other hand, as illustrated in FIG. 1 and FIG. 2, the moving frame 58 is the frame member for holding only the lens 574, and thus a length thereof in the optical axis direction (X direction) is not long. For this reason, the moving frame 58 is provided with a flange part 581, but it is not provided with a cylindrical part corresponding to the cylindrical part 541. However, the moving frame 58 may be provided with the cylindrical part.

The cylindrical part 541 of the moving frame 54 described above is a part provided in a cylindrical shape, and the fixed lens holding frame 55 is held in an inner tube portion of the cylindrical part 541 on the front side (X1 side) in the optical axis direction (X direction).

Note that at an end portion on the front side (X1 side) in the optical axis direction (X1 direction) of the moving frame 54, a positioning recess 54a is provided. The positioning recess 54a is a recessed portion where a tip of a later-described rod part 633 enters, and by the entrance, positioning of an adjusting jig 60 with respect to the moving frame 54 is performed.

Further, the flange part 542 is a part that protrudes toward the outer diameter side from the rear side (X2 side) in the optical axis direction (X direction) of the cylindrical part 541. In the present embodiment, a predetermined number (preferably, 3 or more) of the flange parts 542 are provided in a peripheral direction of the cylindrical part 541, and each said flange part 542 protrudes at predetermined intervals in the peripheral direction. Specifically, the flange parts 542 are not provided along the whole circumference of the cylindrical part 541. Note that to the moving frame 54, a first screw hole 543 is also provided (which will be described later).

Further, the fixed lens holding frame 55 is a cylindrical member (frame member) arranged on the inner diameter side of the moving frame 54 and used for holding the lens 571 (the first adjustment moving lens small group) that constitutes the third lens group 57A. Note that the fixed lens holding frame 55 corresponds to a part of the moving holding frame. This fixed lens holding frame 55 is fixed to the front side (X1 side) of the moving frame 54 via an attachment flange part 555 to be described later, and does not move relative to the moving frame 54. Note that in the present embodiment, the fixed lens holding frame 55 is arranged on the outer diameter side relative to the movable lens holding frame 56, and an inner peripheral side thereof faces an outer peripheral side of the movable lens holding frame 56. However, although the fixed lens holding frame 55 is arranged to protrude toward the rear side (X2 side) in the optical axis direction (X direction) relative to the movable lens holding frame 56, the movable lens holding frame 56 is arranged to protrude toward the front side (X1 side) in the optical axis direction (X direction) relative to the fixed lens holding frame 55.

Further, on the front side (X1 side) in the optical axis direction (X direction) of the fixed lens holding frame 55 on the inner tube side thereof, a standing wall 551 provided in a standing manner toward the outer diameter side is provided, and an enlarged diameter part 552 is provided from a tip on the outer diameter side of the standing wall 551 toward the front side (X1 side). This enlarged diameter part 552 is positioned on the outer side in the radial direction relative to a part (referred to as a cylindrical part 553) on the rear side (X2 side) in the optical axis direction (X direction) of the fixed lens holding frame 55. Note that on an inner surface side of the enlarged diameter part 552, a female screw part 554 to be described later is provided. Further, to the cylindrical part 553, a second screw hole 556 to be described later is provided.

Further, to the foremost side in the optical axis direction (X direction) of the enlarged diameter part 552, there is provided the attachment flange part 555 that protrudes toward the outer diameter side, and via this attachment flange part 555, the fixed lens holding frame 55 is attached to the front side (X1 side) of the moving frame 54 via a screw or the like, for example.

Next, the movable lens holding frame 56 will be described. The movable lens holding frame 56 is a cylindrical member (frame member) for holding the lenses 572, 573 that constitute the third lens group 57A. This movable lens holding frame 56 is arranged on the inner side in the radial direction relative to the fixed lens holding frame 55, and the outer peripheral side thereof faces the inner peripheral side of the fixed lens holding frame 55. Further, the movable lens holding frame 56 is arranged to protrude toward the front side (X1 side) in the optical axis direction (X direction) relative to the fixed lens holding frame 55.

On the front side (X1 side) in the optical axis direction (X direction) of the movable lens holding frame 56, a standing wall 561 provided in a standing manner toward the outer diameter side is provided, and an enlarged diameter part 562 is provided from a tip on the outer diameter side of the standing wall 561 toward the front side (X1 side). The standing wall 561 faces the above-described standing wall 551 in a state where a gap S is formed therebetween. In this gap S, a wave spring W1 (corresponding to an elastic member) is arranged, and the wave spring W1 gives a biasing force in a direction in which the standing wall 551 and the standing wall 561 are separated from each other.

Further, the enlarged diameter part 562 is positioned on the outer side in the radial direction relative to a part (referred to as a cylindrical part 563) on the rear side (X2 side) in the optical axis direction (X direction) of the movable lens holding frame 56. On an outer surface side of the enlarged diameter part 562, a male screw part 564 as will be described later is provided.

Here, on the front side (X1 side) in the optical axis direction (X direction) of the enlarged diameter part 562, an annular flange part 565 protrudes toward the outer diameter side, and on an outer peripheral surface positioned on the outer side in the radial direction of the annular flange part 565, a later-described gear part 566 is formed.

(Regarding Adjustment Mechanism)

Figure 5:
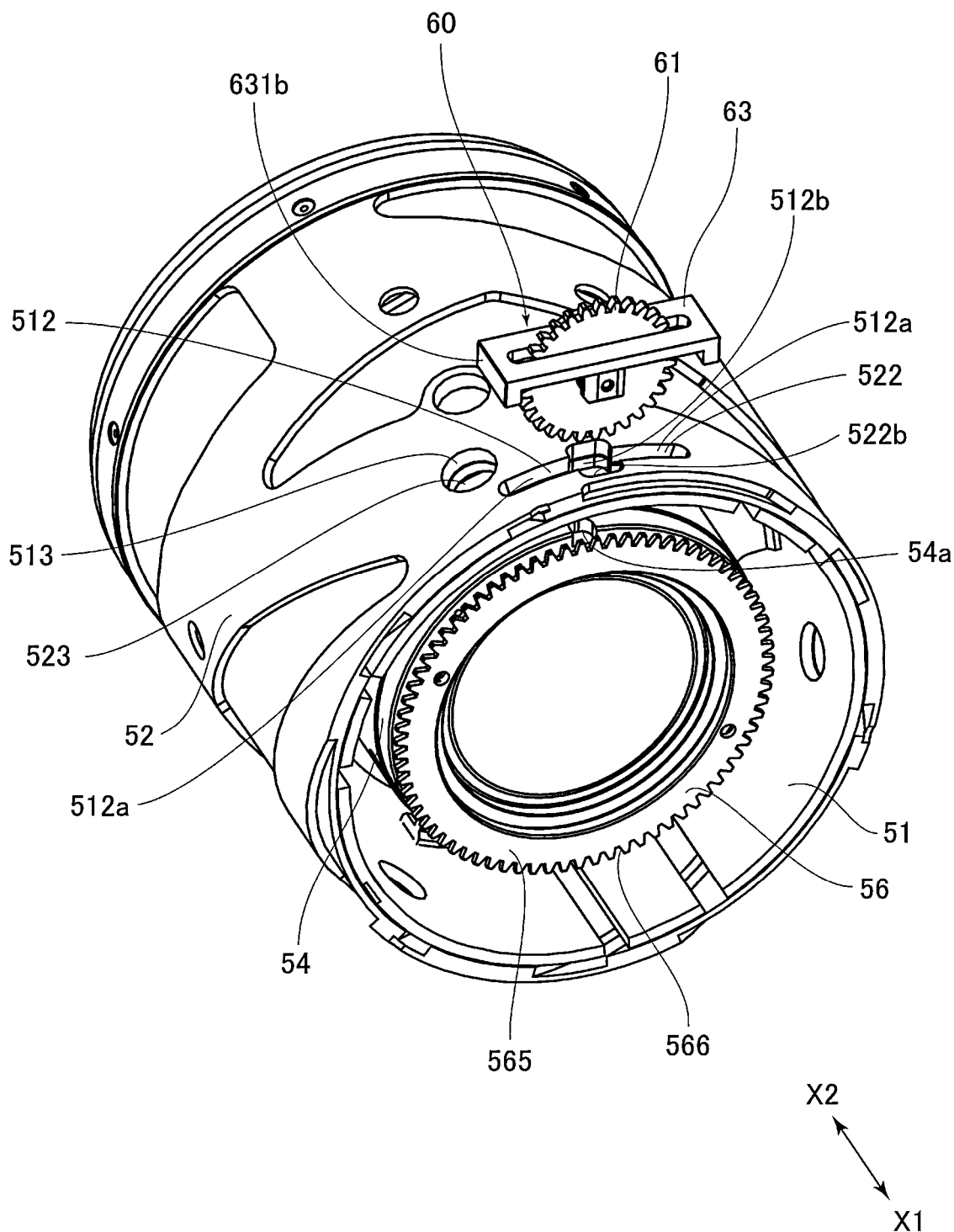
FIG. 5 is a perspective view illustrating a state where the lens barrel illustrated in FIG. 1 in the vicinity of a fixed side hole part is cut at a plane perpendicular to the optical axis.

Next, an adjustment mechanism will be described. FIG. 5 is a perspective view illustrating a state where the lens barrel 10 in the vicinity of a fixed side hole part 512 is cut at a plane perpendicular to the optical axis A1. Note that FIG. 5 is illustrated in a state where the outer tube 20 is omitted. An adjustment mechanism of the present embodiment performs an adjustment of interval between the lens 571 and the lenses 572, 573. This adjustment mechanism includes the fixed side hole part 512, a cam-side hole part 522, the female screw part 554 (corresponding to an inner peripheral engagement part), the male screw part 564 (an outer peripheral engagement part), and the gear part 566 (corresponding to a driving transmission part).

As illustrated in FIG. 3 to FIG. 5, to a portion that does not interfere with the guide groove 511, of the fixed tube 51, the fixed side hole part 512 is provided so as to penetrate the fixed tube 51. Further, to a portion that does not interfere with the cam groove 521, of the cam tube 52, the cam-side hole part 522 is provided so as to penetrate the cam tube 52. These fixed side hole part 512 and cam-side hole part 522 are provided at a position where they are overlapped when the cam tube 52 is rotated with respect to the fixed tube 51. Specifically, when a later-described adjusting jig is inserted in these fixed side hole part 512 and cam-side hole part 522, it is possible to make the adjusting jig protrude inside the cam tube 52.

Note that the above-described position where the fixed side hole part 512 and the cam-side hole part 522 are overlapped, is set to indicate a state where the inner tube side of the fixed tube 51 and the outer tube side of the cam tube 52 are communicated via the fixed side hole part 512 and the cam-side hole part 522 (the inner tube side of the fixed tube 51 can be seen from the outer tube side of the cam tube 52).

The above-described fixed side hole part 512 has a slit-shaped long groove part 512a, and has a shaft groove part 512b at a center portion in a longitudinal direction of the long groove part 512a. In like manner, the cam-side hole part 522 has a slit-shaped long groove part 522a, and has a shaft groove part 522b at a center portion in a longitudinal direction of the long groove part 522a. As illustrated in FIGS. 4A and 4B, when the fixed side hole part 512 and the cam-side hole part 522 are overlapped in a plan view, an adjusting gear 61 of the adjusting jig 60 is inserted in the above-described long groove parts 512a, 522a, and a rotary shaft 62 of the adjusting jig 60 is inserted in the shaft groove parts 512b, 522b. Specifically, the adjusting jig 60 can be inserted in both the cam-side hole part 522 and the fixed side hole part 512.

Figure 6A:
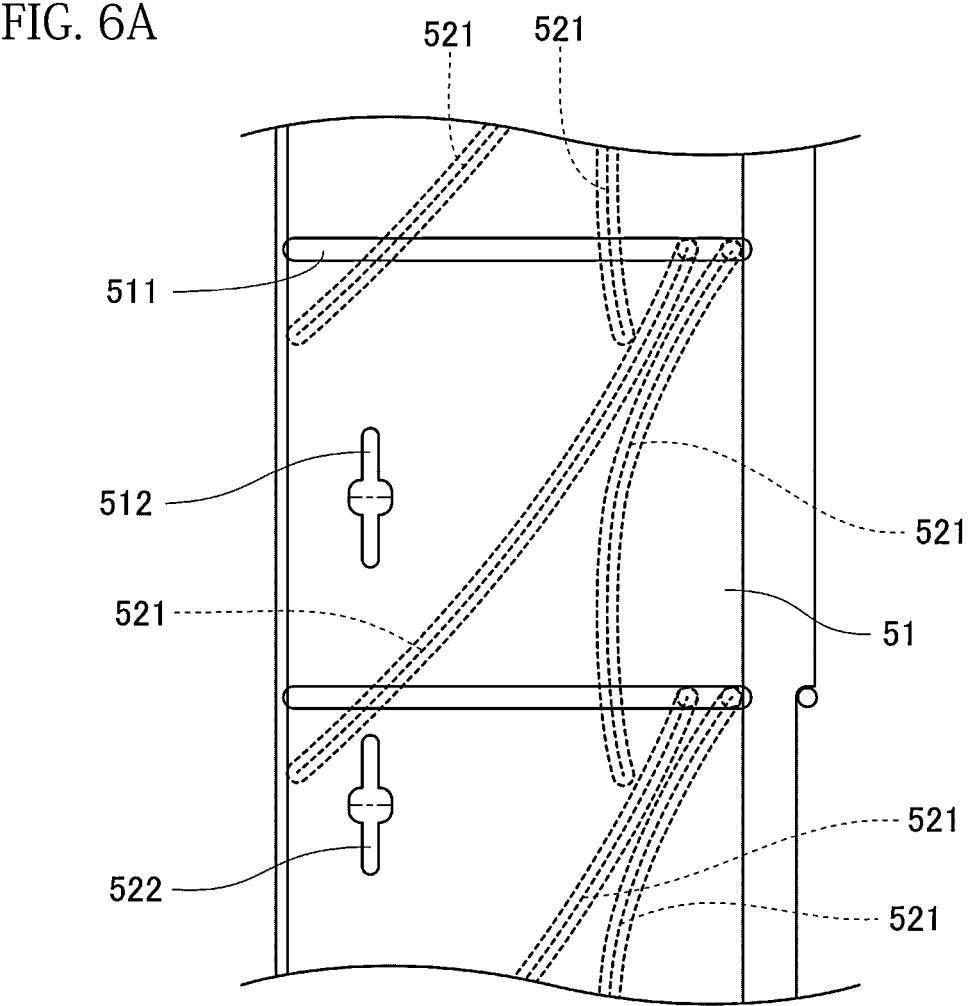
FIGS. 6A and 6B are a view in which the zoom mechanism unit of the lens barrel illustrated in FIG. 1 is developed in a plane, and illustrates a state where a lens held via a moving frame is positioned on the telephoto side (tele side).
Figure 6B:
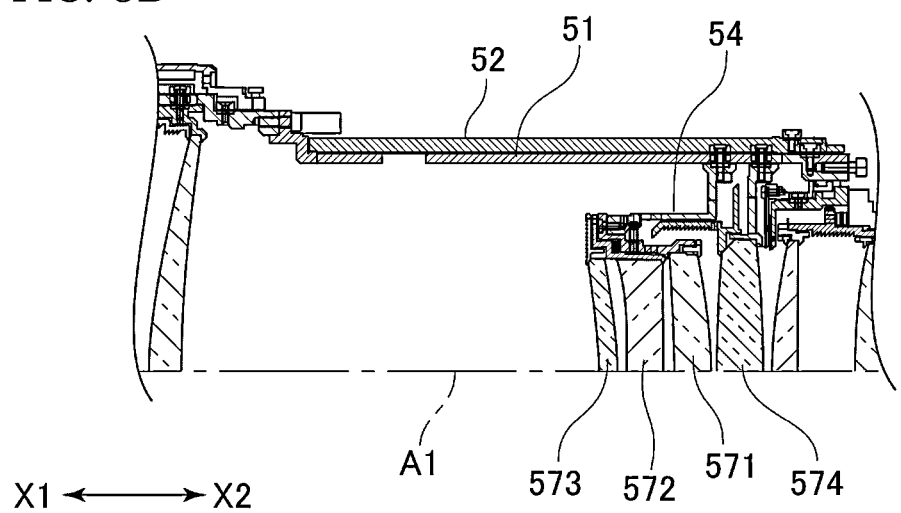
Figure 7A:
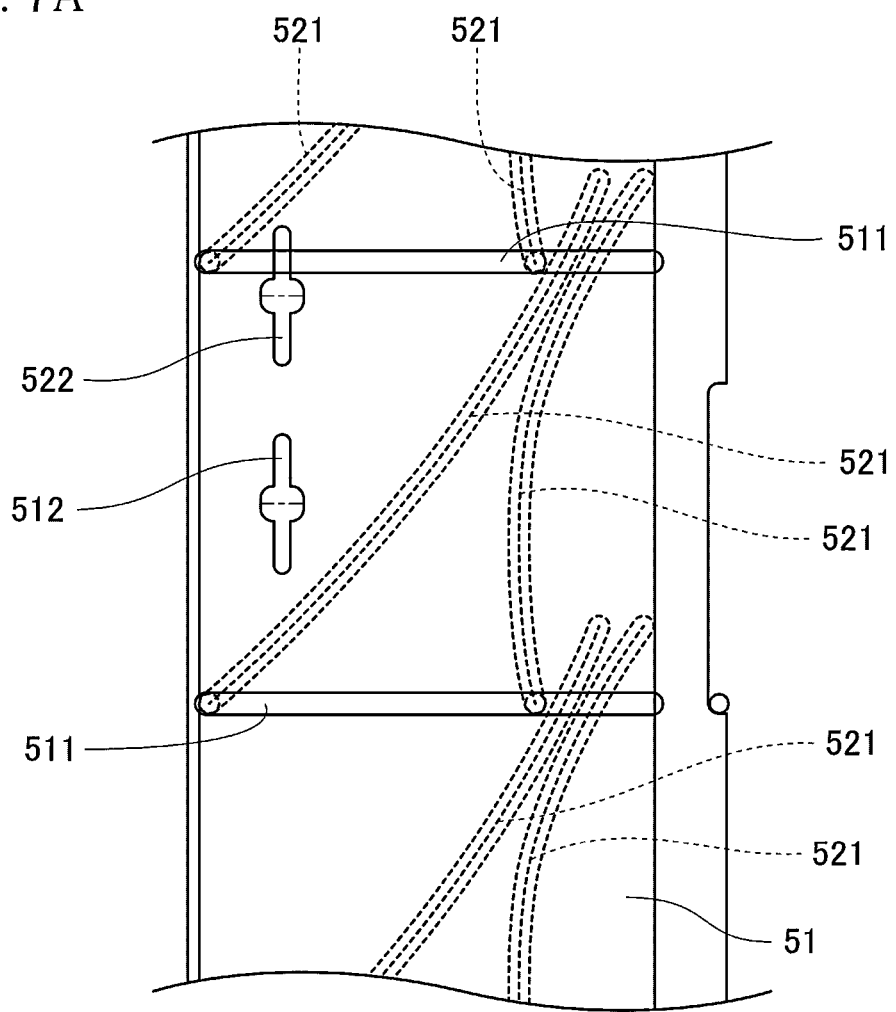
FIGS. 7A and 7B are a view in which the zoom mechanism unit of the lens barrel illustrated in FIG. 1 is developed in a plane, and illustrates a state where the lens held via the moving frame is positioned on the wide-angle side (wide side).
Figure 7B:
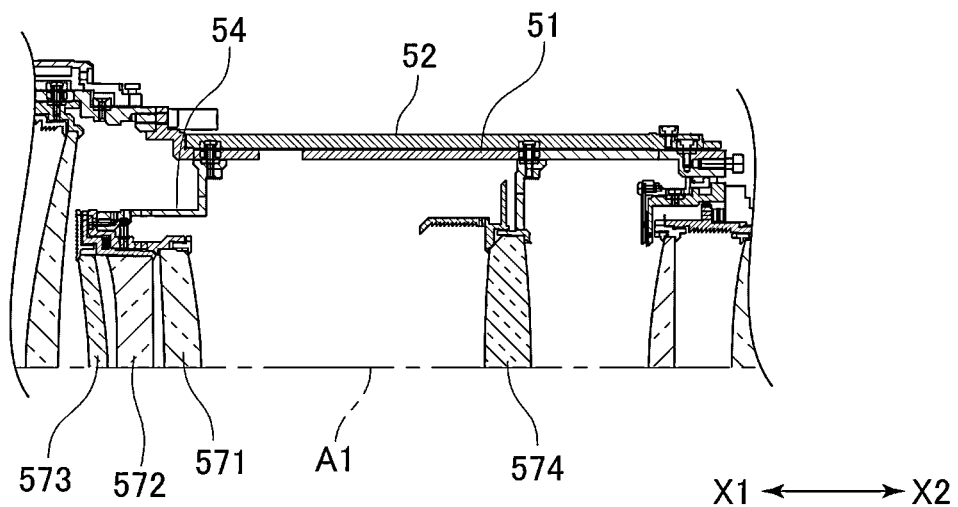

On the contrary, when the fixed side hole part 512 and the cam-side hole part 522 are not overlapped and displaced as illustrated in FIGS. 6A and 6B and FIGS. 7A and 7B, even if it is possible to insert a tip of the adjusting gear 61 of the adjusting jig 60 in the cam-side hole part 522, the tip of the adjusting gear 61 abuts against an outer peripheral surface 51a of the fixed tube 51, and cannot be inserted in the fixed side hole part 512. Note that FIGS. 6A and 6B are a view in which the zoom mechanism unit 50 is developed in a plane, and illustrates a state where the lens 571 held via the moving frame 54 is positioned on the telephoto side (tele side). Further, FIGS. 7A and 7B are a view in which the zoom mechanism unit 50 is developed in a plane, and illustrates a state where the lens 571 held via the moving frame 54 is positioned on the wide-angle side (wide side).

The alignment of the fixed side hole part 512 and the cam-side hole part 522 as described above can be performed by rotating the cam tube 52 relative to the fixed tube 51.

Next, the female screw part 554 (corresponding to the inner peripheral engagement part) and the male screw part 564 (corresponding to the outer peripheral engagement part) will be described. The female screw part 554 is provided on the inner surface side of the enlarged diameter part 552 of the fixed lens holding frame 55 described above. Further, the male screw part 564 is provided on the outer surface side of the enlarged diameter part 562 of the movable lens holding frame 56 described above. These female screw part 554 and male screw part 564 are screw-coupled. For this reason, when the movable lens holding frame 56 is rotated with respect to the fixed lens holding frame 55 by the adjusting jig 60, the movable lens holding frame 56 can be moved in the optical axis direction (X direction) with respect to the fixed lens holding frame 55. This makes it possible to perform the interval adjustment between the lens 571 held by the fixed lens holding frame 55, and the lens 572 and the lens 573 held by the movable lens holding frame 56.

Further, the gear part 566 is provided to the outer peripheral surface of the annular flange part 565 of the movable lens holding frame 56. The gear part 566 is a part with which the adjusting gear 61 of the adjusting jig 60 to be described later engages, and when the adjusting gear 61 rotates, the gear part 566 (the movable lens holding frame 56) rotates. Accordingly, it is configured such that the movable lens holding frame 56 moves in the optical axis direction (X direction) with respect to the fixed lens holding frame 55.

(Regarding Position Fixing Mechanism)

The lens barrel 10 is provided with a position fixing mechanism for fixing, after the interval adjustment between the fixed lens holding frame 55 (the lens 571) and the movable lens holding frame 56 (the lenses 572, 573) is finished, positions of both frames. This position fixing mechanism has the first screw hole 543, the second screw hole 556, a fixing screw S1, a fixed side through hole 513, and a cam-side through hole 523. Note that the first screw hole 543 corresponds to a screw hole.

As illustrated in FIG. 3, the moving frame 54 is provided with the first screw hole 543 that penetrates the cylindrical part 541, and the fixing screw S1 is screwed in the first screw hole 543. Further, the fixed lens holding frame 55 is provided with the second screw hole 556 that penetrates the cylindrical part 553, and the above-described fixing screw S1 is screwed in the second screw hole 556.

The first screw hole 543 and the second screw hole 556 are aligned so that their positions in the optical axis direction (X direction) and the peripheral direction become the same. Therefore, when the fixing screw S1 is screwed in the first screw hole 543, the fixing screw S1 is screwed in the second screw hole 556 as well, and protrudes toward the inner diameter side of the cylindrical part 553. Further, the fixing screw S1 abuts against an outer peripheral surface of the movable lens holding frame 56. Specifically, when, after finishing a later-described optical performance evaluation, the fixing screw S1 is screwed in the first screw hole 543 and the second screw hole 556 to make a tip of the fixing screw S1 abut against the movable lens holding frame 56, there is created a state where the positions of the fixed lens holding frame 55 and the movable lens holding frame 56 are fixed and thus not varied. Consequently, a relative position between the lens 571 and the lenses 572, 573 is fixed.

Note that the fixing screw S1 is preferably a setscrew having no head portion. In this case, it is possible to create a state where the fixing screw S1 does not protrude toward the outer diameter side from the first screw hole 543. However, it is possible to use a screw having a head portion, as the fixing screw S1.

Further, as illustrated in FIG. 5, the fixed side through hole 513 that penetrates the fixed tube 51 is formed on the fixed tube 51. In this fixed side through hole 513, the above-described fixing screw S1 and a tool for screwing the fixing screw S1 are to be inserted.

In like manner, as illustrated in FIG. 5, the cam-side through hole 523 that penetrates the cam tube 52 is formed on the cam tube 52, and also in this cam-side through hole 523, the above-described fixing screw S1 and the tool for screwing the fixing screw S1 are to be inserted. Here, when the cam-side hole part 522 is aligned with the fixed side hole part 512, the cam-side through hole 523 is arranged at a position at which it exists in the same straight line as the first screw hole 543, the second screw hole 556, and the fixed side through hole 513. Specifically, the position of the cam-side through hole 523 is set so that when the cam tube 52 is rotated to perform the alignment of the fixed side hole part 512 and the cam-side hole part 522, the alignment of the fixed side through hole 513 and the cam-side through hole 523 is performed.

Figure 8:
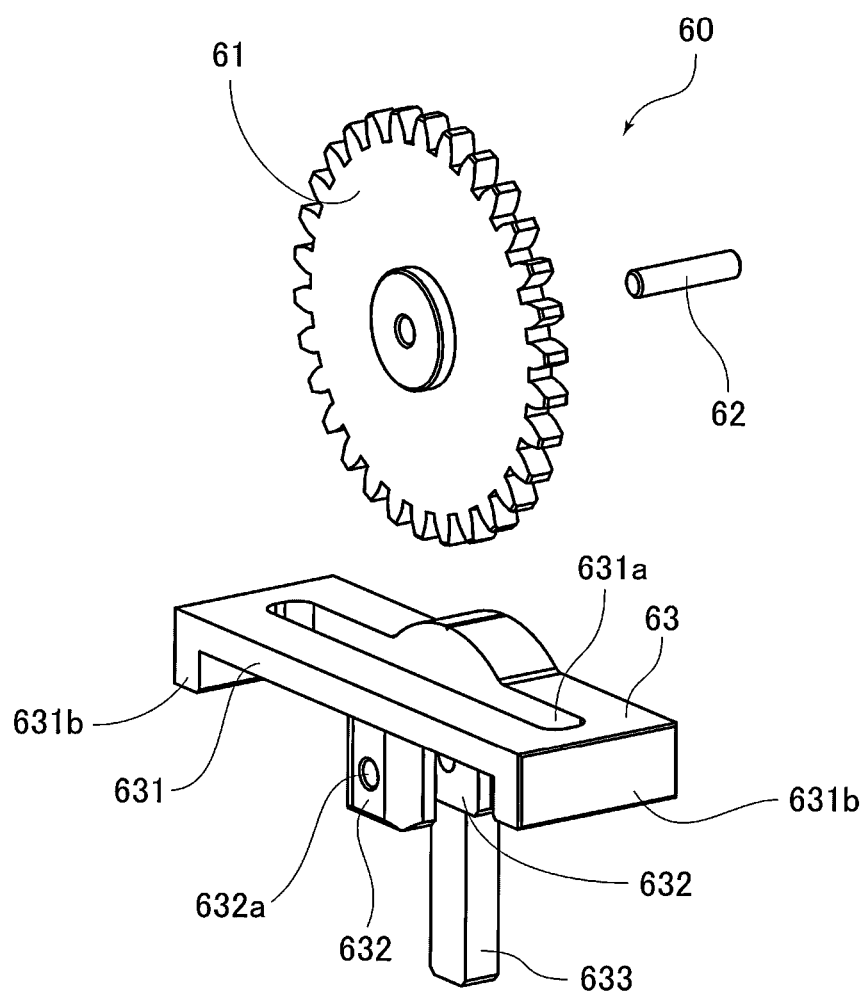
FIG. 8 is an exploded perspective view illustrating a configuration of an adjusting jig used in the present embodiment.

Next, the adjusting jig 60 will be described. FIG. 8 is an exploded perspective view illustrating a configuration of the adjusting jig 60. As illustrated in FIG. 3, FIG. 5, and FIG. 8, the adjusting jig 60 has the adjusting gear 61, the rotary shaft 62, and a gear support 63. The adjusting gear 61 is a member that is pivotally supported in a rotatable manner by the rotary shaft 62, and that engages with the above-described gear part 566. Accordingly, the rotation of the adjusting gear 61 can rotate the movable lens holding frame 56. Further, the rotary shaft 62 is a shaft-shaped member that rotatably supports the adjusting gear 61.

Further, the gear support 63 is a part that rotatably supports the adjusting gear 61. This gear support 63 has a base part 631, pivotal support parts 632, and a rod part 633. The base part 631 is a frame-shaped part having a long hole 631a in which the adjusting gear 61 can be inserted, and rotatably supports the adjusting gear 61 via the rotary shaft 62. On both end sides in the longitudinal direction of the base part 631, there are provided abutting protrusions 631b that protrude downward, and the abutting protrusions 631b abut against an outer peripheral surface of the cam tube 52. This prevents the other portions of the base part 631 from abutting against the outer peripheral surface of the cam tube 52, resulting in that the adjusting gear 61 can rotate in a stable manner.

Further, the pivotal support parts 632 are parts that further protrude downward from a lower surface at a center in the longitudinal direction of the base part 631, and are parts to be inserted in the above-described shaft groove parts 512b, 522b. Each of the pivotal support parts 632 is provided with a hole part 632a for inserting the rotary shaft 62 therein. Therefore, the pivotal support parts 632 rotatably support the adjusting gear 61 via the rotary shaft 62.

Further, as illustrated in FIG. 8, the rod part 633 is a rod-shaped part that protrudes downward from one of the pivotal support parts 632. Note that the rod part 633 may also be provided completely separately from the one of the pivotal support parts 632. This rod part 633 is a part to be fitted into the positioning recess 54a that is provided on the outer peripheral surface on the front side (X1 side) of the moving frame 54, and by the fitting, a relative position of the adjusting jig 60 in the peripheral direction of the moving frame 54 is determined.

[Regarding Operations]

In the lens barrel 10 configured as described above, it is possible to perform the interval adjustment between the lens 571 held by the fixed lens holding frame 55, and the lenses 572, 573 held by the movable lens holding frame 56, from the outside of the lens barrel 10 by using the adjusting jig 60.

Specifically, the cam tube 52 is rotated relative to the fixed tube 51 to create a state where the fixed side hole part 512 and the cam-side hole part 522 are positioned at a position where they are communicated with each other (a position where they are overlapped with each other). Thereafter, the adjusting gear 61 of the adjusting jig 60 is inserted in the fixed side hole part 512 and the cam-side hole part 522, to perform alignment so that the rod part 633 of the gear support 63 enters the positioning recess 54a of the moving frame 54.

In the above-described aligned state, a tooth shape of the adjusting gear 61 is in a state of engaging with the gear part 566 provided to the annular flange part 565 of the movable lens holding frame 56. Specifically, by the relative rotation between the fixed tube 51 and the cam tube 52, the movable lens holding frame 56 moves in the optical axis direction (X direction) via the moving frame 54. Further, in a state where the fixed side hole part 512 and the cam-side hole part 522 are positioned at the position where they are communicated with each other, the gear part 566 also overlaps with the fixed side hole part 512 and the cam-side hole part 522 in a direction orthogonal to the optical axis direction (X direction) (optical axis orthogonal direction). Further, in this engaged state, the abutting protrusions 631b of the base part 631 are in a state of abutting against the outer peripheral surface of the cam tube 52.

When the adjusting gear 61 is rotated in this engaged state, the movable lens holding frame 56 moves in the optical axis direction (X direction) relative to the fixed lens holding frame 55, by a screw action between the female screw part 554 and the male screw part 564. This changes a distance (lens interval) of the lenses 572, 573 held by the movable lens holding frame 56 with respect to the lens 571 held by the fixed lens holding frame 55. Accordingly, an appropriate lens interval is set, the optical performance evaluation regarding various aberrations and the like is then performed, and if the lens interval is required to be adjusted again as a result of the evaluation, the adjusting gear 61 is rotated again, to thereby move the movable lens holding frame 56 in the optical axis direction (X direction) with respect to the fixed lens holding frame 55.

The adjustment as described above is executed until when the optical performance evaluation falls within a predetermined standard. Note that such an optical performance evaluation is preferably performed on the wide-angle side (wide side) and the telephoto side (tele side), respectively.

Note that after finishing the optical performance evaluation as described above, the fixing screw S1 is screwed in the first screw hole 543 and the second screw hole 556 to make the tip of the fixing screw S1 abut against the movable lens holding frame 56. This creates a state where the positions of the fixed lens holding frame 55 and the movable lens holding frame 56 are fixed and thus not varied, resulting in that the relative position between the lens 571 and the lenses 572, 573 is fixed.

Further, after the fixing screw S1 is screwed in the first screw hole 543 and the second screw hole 556 to make the tip of the fixing screw S1 abut against the movable lens holding frame 56, it is preferable to block the cam-side hole part 522, the cam-side through hole 523, and the like by a tape or the like, for example.

[Regarding Effects]

The lens barrel 10 configured as described above includes: the fixed tube 51 on which the guide groove 511 that is along the optical axis direction (X direction) and where the cam follower 53 enters is formed; the cam tube 52 rotatably provided with respect to the fixed tube 51, and having the cam groove 521 where the cam follower 53 enters and that is oblique with respect to the optical axis direction (X direction); the zoom mechanism unit 50 that changes the focal distance by moving the third lens group 57A (the moving lens group, the adjustment moving lens group) being at least one of the lens groups; and the adjustment mechanism for adjusting the position in the optical axis direction (X direction) of at least one lens 573 (the optical element, the first adjustment moving lens) constituting the third lens group 57A (the moving lens group, the adjustment moving lens group) being at least one of the lens groups.

Further, the zoom mechanism unit 50 (the moving mechanism unit) includes: the moving frame 54 (the moving holding frame) to which the cam follower 53 is attached, and that moves in the optical axis direction (X direction) in accordance with the relative rotation of the cam tube 52 with respect to the fixed tube 51; and the movable lens holding frame 56 that holds at least one lens 573 (the optical element, the second adjustment moving lens small group) of the third lens group 57A (the moving lens group, the adjustment moving lens group).

Further, the adjustment mechanism includes: the fixed side hole part 512 that penetrates the fixed tube 51; the cam-side hole part 522 that penetrates the cam tube 52, and that is aligned with the fixed side hole part 512 when the cam tube 52 is rotated with respect to the fixed tube 51; the gear part 566 (the driving transmission part) that is provided on the outer peripheral side of the movable lens holding frame 56 in the same straight line as the fixed side hole part 512 and the cam-side hole part 522 in a state where these hole parts are aligned; the female screw part 554 (the inner peripheral engagement part) that is formed on the inner peripheral surface of the fixed lens holding frame 55 (the moving holding frame); and the male screw part 564 (the outer peripheral engagement part) that is formed on the outer peripheral surface of the movable lens holding frame 56 in a state of engaging with the female screw part 554 (the inner peripheral engagement part), and moves the movable lens holding frame 56 in the optical axis direction (X direction) by rotating with respect to the female screw part 554 (the inner peripheral engagement part) when an external force is transmitted in the rotational direction via the gear part 566 (the driving transmission part).

By the configuration as described above, after the fixed side hole part 512 and the cam-side hole part 522 are in a state of being positioned at the position where they are communicated with each other (the position where they are overlapped with each other), the adjusting gear 61 of the adjusting jig 60 is inserted from the outside in the fixed side hole part 512 and the cam-side hole part 522 to make the adjusting gear 61 of the adjusting jig 60 to be engaged with the gear part 566 (the driving transmission part). When, under the state, the gear part 566 (the driving transmission part) is rotated via the adjusting gear 61, the movable lens holding frame 56 moves in the optical axis direction (X direction) with respect to the fixed lens holding frame 55 (the moving holding frame) because of the engagement between the female screw part 554 (the inner peripheral engagement part) and the female screw part 554 (the inner peripheral engagement part). Accordingly, it becomes possible to perform the fine adjustment of the lens interval of the third lens group 57A (the moving lens group, the adjustment moving lens group) by inserting the adjusting jig 60 from the outside via the fixed side hole part 512 and the cam-side hole part 522, without disassembling the lens barrel 10.

For this reason, even if the optical performance evaluation after performing the fine adjustment of the lens interval of the third lens group 57A (the moving lens group, the adjustment moving lens group) does not fall within the predetermined standard, there is no need to adjust the lens interval of the third lens group 57A (the moving lens group, the adjustment moving lens group) by disassembling the lens barrel 10. Further, it is possible to save labor such that the lens barrel 10 is disassembled to adjust the lens interval of the third lens group 57A (the moving lens group, the adjustment moving lens group), and then the lens barrel 10 is assembled again, resulting in that the man-hour can be reduced. Further, when disassembling and assembling the lens barrel 10, it is possible to prevent problems such that dust enters inside the lens barrel 10 or a lens is damaged.

Further, since the configuration in which, when the gear part 566 (the driving transmission part) is rotated via the adjusting gear 61, the movable lens holding frame 56 moves in the optical axis direction (X direction) with respect to the fixed lens holding frame 55 (the moving holding frame) because of the engagement between the female screw part 554 (the inner peripheral engagement part) and the female screw part 554 (the inner peripheral engagement part) is adopted, the adjustment of the lens interval of the third lens group 57A (the moving lens group, the adjustment moving lens group) is not limited by the lineup of the shim or the washer, and it becomes possible to perform the fine adjustment of the lens interval such as 0.01 mm or less, for example.

Further, the adjustment of the lens interval can be performed without disassembling the lens barrel 10, so that it becomes possible to perform the fine adjustment of the lens interval of the third lens group 57A (the moving lens group, the adjustment moving lens group) by inserting the adjusting jig 60 from the outside via the fixed side hole part 512 and the cam-side hole part 522, while watching a projected image of the lens barrel 10 and measured values, resulting in that the optical performance evaluation can be made to fall within the predetermined standard by one time of fine adjustment.

Further, in the present embodiment, the third lens group 57A (the adjustment moving lens group) has at least the lens 571 (the first adjustment moving lens small group) and the lenses 572, 573 (the second adjustment moving lens small group), in which the lens 571 (the first adjustment moving lens small group) is held by the fixed lens holding frame 55 (the moving holding frame), and the lenses 572, 573 (the second adjustment moving lens small group) are held by the movable lens holding frame 56.

Accordingly, it becomes possible to perform the fine adjustment of the lens interval between the lens 571 (the first adjustment moving lens small group) held by the fixed lens holding frame 55 (the moving holding frame) and the lenses 572, 573 (the second adjustment moving lens small group) held by the movable lens holding frame 56.

Further, the present embodiment includes the position fixing mechanism that fixes the positions of the fixed lens holding frame 55 and the movable lens holding frame 56 after the interval adjustment of the frames in the adjustment mechanism is finished. Further, the position fixing mechanism includes: the first screw hole 543 (the screw hole) that penetrates the cylindrical part 541 provided to the moving frame 54 (the moving holding frame); the fixing screw S1 that is screwed in the first screw hole 543 (the screw hole); the fixed side through hole 513 that penetrates the fixed tube 51, allows the fixing screw S1 to be inserted therein, and exists in the same straight line as the first screw hole 543 (the screw hole); and the cam-side through hole 523 that penetrates the cam tube 52, allows the fixing screw S1 to be inserted therein, and exists in the same straight line as the first screw hole 543, the second screw hole 556, and the fixed side through hole 513 when the cam-side hole part 522 is aligned with the fixed side hole part 512.

Accordingly, in a case where the optical performance evaluation falls within the predetermined standard, and the adjustment of the lens interval of the third lens group 57A (the adjustment moving lens group) is finished, by inserting the fixing screw S1 in the fixed side hole part 512 and the cam-side hole part 522, and then screwing it in the first screw hole 543 (the screw hole), the tip of the fixing screw S1 can be made to abut against the movable lens holding frame 56. This can create a state where the positions of the fixed lens holding frame 55 and the movable lens holding frame 56 are fixed and thus not varied, resulting in that the relative position between the lens 571 and the lenses 572, 573 can be fixed.

Further, in the present embodiment, the fixed side through hole 513 is provided at a position at which it does not interfere with the fixed side hole part 512, and the cam-side through hole 523 is provided at a position at which it does not interfere with the cam-side hole part 522.

Accordingly, also in a state where the adjusting jig 60 is inserted in the fixed side hole part 512 and the cam-side hole part 522, it is possible to screw the fixing screw S1 in the first screw hole 543 (the screw hole) while inserting the fixing screw S1 via the fixed side through hole 513 and the cam-side through hole 523.

Further, in the present embodiment, the moving frame 54 is provided with the positioning recess 54*a* (the positioning engagement part) for performing the positioning of the adjusting jig 60 that is inserted from the outside.

Accordingly, the adjusting jig 60 can be positioned at an appropriate position with respect to the gear part 566. Consequently, it becomes possible to easily perform the adjustment of the lens interval of the third lens group 57A (the adjustment moving lens group).

Further, in the present embodiment, at the gap S between the fixed lens holding frame 55 (the moving holding frame) and the movable lens holding frame 56, the wave spring W1 (the elastic member) that biases both members in a direction in which the members are separated from each other is arranged.

Accordingly, the movable lens holding frame 56 can move relative to the fixed lens holding frame 55 (the moving holding frame), and at the same time, it is possible to prevent the occurrence of rattling between the fixed lens holding frame 55 (the moving holding frame) and the movable lens holding frame 56.

Modified Examples

Although one embodiment of the present invention has been described above, the present invention is not limited to the above and can be modified in various ways. The modified examples will be described hereinbelow.

The above-described embodiment explains the configuration in which only one fixed side hole part 512 and only one cam-side hole part 522 are provided in the optical axis direction (X direction). However, it is possible to adopt a configuration in which a plurality of the fixed side hole parts 512 and the cam-side hole parts 522 are provided in the optical axis direction (X direction).

In this case, it is possible to design such that a set of the fixed side hole part 512 and the cam-side hole part 522 is provided on the wide-angle side (wide side) and the telephoto side (tele side), respectively, for example. This makes it possible to perform the adjustment of the lens interval of the third lens group 57A (the adjustment moving lens group) while performing the optical performance evaluation by positioning the moving frame 54, the fixed lens holding frame 55, and the movable lens holding frame 56 on the wide-angle side (wide side). Further, it is possible to perform the adjustment of the lens interval of the third lens group 57A (the adjustment moving lens group) while performing the optical performance evaluation by positioning the moving frame 54, the fixed lens holding frame 55, and the movable lens holding frame 56 on the telephoto side (tele side). Consequently, it is possible to realize the state where the optical performance falls within the predetermined standard on both the wide-angle side (wide side) and the telephoto side (tele side), without disassembling the lens barrel 10.

Further, in the present embodiment, by relatively moving the fixed lens holding frame 55 and the movable lens holding frame 56, the lens interval between the lens 571 (the first adjustment moving lens small group) and the lenses 572, 573 (the second adjustment moving lens small group) is adjusted. However, it is also possible to design such that an adjustment mechanism similar to that of the present embodiment is used to adjust a lens interval of another lens of the third lens group 57A (the adjustment moving lens group). Further, it is also possible to design such that an adjustment mechanism similar to that of the present embodiment is used to adjust a lens interval in the second lens group 43A of the focus mechanism unit 40, for example. A focal distance or a focal position may be changed by that.

Further, it is also possible to design such that the entire third lens group 57A (the lenses 571, 572, 573) is held by the movable lens holding frame 56, the fixed lens holding frame 55 is omitted, and the position of the third lens group 57A with respect to the entire optical system is adjusted (an interval between the third lens group 57A and a lens group adjacent to the third lens group 57A in the optical axis direction is adjusted) by the adjustment mechanism.

Further, in the above-described embodiment, the lens barrel 10 is attached to an imaging device such as a camera main body of a camera device, and when the lens barrel 10 is attached to the camera main body, it constitutes a lens-interchangeable camera. However, the lens barrel 10 may also be one that is attached to a camera main body whose lens is not interchangeable. Further, the lens barrel 10 may also be attached to a different optical device such as a projecting device such as a projector device or the like, for example.

Further, in the above-described embodiment, the moving frame 54 is provided with the positioning recess 54*a* (the positioning engagement part) for performing positioning of the adjusting jig 60 that is inserted from the outside. However, it is also possible to provide a positioning recess (a positioning engagement part) similar to the positioning recess 54*a*, to the fixed lens holding frame 55. Note that the positioning engagement part is not limited to the positioning recess, but may also be a positioning protrusion.

Further, in the above-described embodiment, the moving frame 54 and the fixed lens holding frame 55 are explained as separate members, but the moving frame 54 and the fixed lens holding frame 55 are integrated during not only the movement in the optical axis direction (X direction) at the time of zooming but also the adjustment by the adjustment mechanism. Accordingly, the fixed lens holding frame 55 can be regarded as a part of the moving frame 54, so that the moving frame 54 and the fixed lens holding frame 55 may also be provided as one member. For example, by connecting an end portion on the front side (X1 side) of the moving frame 54 and an end portion on the rear side (X2 side) of the fixed lens holding frame 55, both members can be integrally formed. In that case, by integrating the cylindrical part 541 of the moving frame 54 and the cylindrical part 553 of the fixed lens holding frame 55, these parts are formed as one cylindrical part, so that the first screw hole 543 formed on the cylindrical part 541 becomes unnecessary, and thus the number of the screw hole becomes one.

Further, in the above-described embodiment, the gear part 566 is explained as the driving transmission part. However, the driving transmission part is not limited to the gear part, and it may also be one having recessed and protruding portions by which a tip of a pin that is inserted from the outside is caught, for example.

However, in the present embodiment, the female screw part 554 is explained as the inner peripheral engagement part, and the male screw part 564 is explained as the outer peripheral engagement part. However, the inner peripheral engagement part is not limited to the female screw part 554, and the outer peripheral engagement part is not limited to the male screw part 564. For example, it is possible to design such that a spiral cam groove is formed on the inner peripheral surface of the cylindrical part 553 to use this cam groove as the inner peripheral engagement part, and a cam follower is formed on the outer peripheral surface of the cylindrical part 563 to use this cam follower as the outer peripheral engagement part. Further, it is possible to design such that a cam follower is formed on the inner peripheral surface of the cylindrical part 553 to use this cam follower as the inner peripheral engagement part, and a spiral cam groove is formed on the outer peripheral surface of the cylindrical part 563 to use this cam groove as the outer peripheral engagement part.

Further, in the above-described embodiment, the wave spring W1 is explained as the elastic member, but the elastic member is not limited to the wave spring W1. For example, an elastic body such as a coil spring or an elastomer may be used as the elastic member.

Further, the above-described embodiment explains the case where the lens barrel 10 is attached to a camera main body of a camera device being one example of an imaging device having an imaging element. However, the imaging device having the imaging element is not limited to the camera device. For example, each of various inspection devices may be set as the imaging device. Further, an image display device having an image display element may include the above-described lens barrel. In that case, it is possible to adopt a configuration in which the image display element is arranged on the telephoto side of the lens barrel according to the above-described embodiment.

The invention claimed is:

1. A lens barrel holding a lens system therein, the lens system having a plurality of lens groups each having one or more optical elements, the lens barrel comprising:
   a fixed tube on which a guide groove that is along an optical axis direction and where a cam follower enters is formed;
   a cam tube rotatably provided with respect to the fixed tube, and having a cam groove where the cam follower enters and that is oblique with respect to the optical axis direction;
   a moving mechanism unit that changes a focal distance or a focal position by moving at least one lens group out of the lens groups, as a moving lens group, in the optical axis direction; and
   an adjustment mechanism for adjusting a position in the optical axis direction of at least one of the optical elements constituting an adjustment moving lens group being at least one of the moving lens groups, wherein:
   the moving mechanism unit includes:
   a moving holding frame to which the cam follower is attached, and that moves in the optical axis direction in accordance with a relative rotation of the cam tube with respect to the fixed tube; and
   a movable lens holding frame that holds at least a part of the optical elements of the moving lens group; and
   the adjustment mechanism includes:
   a fixed side hole part that penetrates the fixed tube;
   a cam-side hole part that penetrates the cam tube, and that is aligned with the fixed side hole part when the cam tube is rotated with respect to the fixed tube;
   a driving transmission part that is provided on an outer peripheral side of the movable lens holding frame in the same straight line as the fixed side hole part and the cam-side hole part in a state where these hole parts are aligned;
   an inner peripheral engagement part that is formed on an inner peripheral surface of the moving holding frame; and
   an outer peripheral engagement part that is formed on an outer peripheral surface of the movable lens holding frame in a state of engaging with the inner peripheral engagement part, and moves the movable lens holding frame in the optical axis direction by rotating with respect to the inner peripheral engagement part when an external force is transmitted in a rotational direction via the driving transmission part.

2. The lens barrel according to claim 1, wherein the adjustment moving lens group has at least a first adjustment moving lens small group and a second adjustment moving lens small group, wherein:
   the first adjustment moving lens small group is held by the moving holding frame; and
   the second adjustment moving lens small group is held by the movable lens holding frame.

3. The lens barrel according to claim 1, further comprising a position fixing mechanism that fixes positions of the fixed lens holding frame and the movable lens holding frame after the interval adjustment of the frames by the adjustment mechanism is finished, wherein
   the position fixing mechanism includes:
   a screw hole that penetrates a cylindrical part provided to the moving holding frame;
   a fixing screw that is screwed in the screw hole;
   a fixed side through hole that penetrates the fixed tube, allows the fixing screw to be inserted therein, and exists in the same straight line as the screw hole; and
   a cam-side through hole that penetrates the cam tube, allows the fixing screw to be inserted therein, and exists in the same straight line as the screw hole and the fixed side through hole when the cam-side hole part is aligned with the fixed side hole part.

4. The lens barrel according to claim 3, wherein:
   the fixed side through hole is provided at a position at which it does not interfere with the fixed side hole part; and
   the cam-side through hole is provided at a position at which it does not interfere with the cam-side hole part.

5. The lens barrel according to claim 1, wherein the moving holding frame is provided with a positioning engagement part for performing positioning of an adjusting jig that is inserted from the outside.

6. The lens barrel according to claim 1, wherein at a gap between the moving holding frame and the movable lens holding frame, an elastic member that biases both members in a direction in which the members are separated from each other is arranged.

7. The lens barrel according to claim 5, wherein a plurality of the fixed side hole parts and the cam-side hole parts are provided at positions separated in the optical axis direction.

8. An imaging device, comprising: the lens barrel according to claim 1; and an imaging element arranged on a telephoto side of the lens barrel.

9. An image display device, comprising: the lens barrel according to claim 1; and an image display element arranged on a telephoto side of the lens barrel.

10. The lens barrel according to claim 2, further comprising
    a position fixing mechanism that fixes positions of the fixed lens holding frame and the movable lens holding frame after the interval adjustment of the frames by the adjustment mechanism is finished, wherein the position fixing mechanism includes:

a screw hole that penetrates a cylindrical part provided to the moving holding frame;

a fixing screw that is screwed in the screw hole;

a fixed side through hole that penetrates the fixed tube, allows the fixing screw to be inserted therein, and exists in the same straight line as the screw hole; and a cam-side through hole that penetrates the cam tube, allows the fixing screw to be inserted therein, and exists in the same straight line as the screw hole and the fixed side through hole when the cam-side hole part is aligned with the fixed side hole part.

11. The lens barrel according to claim 10, wherein:

the fixed side through hole is provided at a position at which it does not interfere with the fixed side hole part; and the cam-side through hole is provided at a position at which it does not interfere with the cam-side hole part.

12. The lens barrel according to claim 3, wherein the moving holding frame is provided with a positioning engagement part for performing positioning of an adjusting jig that is inserted from the outside.

13. The lens barrel according to claim 3, wherein at a gap between the moving holding frame and the movable lens holding frame, an elastic member that biases both members in a direction in which the members are separated from each other is arranged.

14. The lens barrel according to claim 3, wherein a plurality of the fixed side hole parts and the cam-side hole parts are provided at positions separated in the optical axis direction.

15. The lens barrel according to claim 10, wherein the moving holding frame is provided with a positioning engagement part for performing positioning of an adjusting jig that is inserted from the outside.

16. The lens barrel according to claim 10, wherein at a gap between the moving holding frame and the movable lens holding frame, an elastic member that biases both members in a direction in which the members are separated from each other is arranged.

17. The lens barrel according to claim 10, wherein a plurality of the fixed side hole parts and the cam-side hole parts are provided at positions separated in the optical axis direction.

* * * * *